(12) United States Patent
Mufti

(10) Patent No.: US 10,044,448 B2
(45) Date of Patent: Aug. 7, 2018

(54) SONIC SIGNALING COMMUNICATION FOR USER DEVICES

(75) Inventor: Mohammed Umair Mufti, Tustin, CA (US)

(73) Assignee: SPARCQ, INC., Tustin, CA (US)

( * ) Notice: Subject to any disclaimer, the term of this patent is extended or adjusted under 35 U.S.C. 154(b) by 1082 days.

(21) Appl. No.: 13/110,847

(22) Filed: May 18, 2011

(65) Prior Publication Data

US 2012/0295560 A1    Nov. 22, 2012

(51) Int. Cl.
| | |
|---|---|
| *H04B 7/00* | (2006.01) |
| *H04B 13/00* | (2006.01) |
| *H04N 21/439* | (2011.01) |
| *H04N 21/462* | (2011.01) |

(52) U.S. Cl.
CPC ......... *H04B 13/00* (2013.01); *H04N 21/4394* (2013.01); *H04N 21/4622* (2013.01)

(58) Field of Classification Search
CPC .......... G06Q 30/0224; G06Q 30/0236; G06Q 30/0251; G10L 19/018; H04N 21/4126; H04N 21/812; H04N 21/25891; H04N 21/42203
USPC ............... 455/42–45, 67.7, 70, 41.1–41.3
See application file for complete search history.

(56) References Cited

U.S. PATENT DOCUMENTS

| | | | |
|---|---|---|---|
| 5,263,006 A | 11/1993 | Hermesmeyer | |
| 7,349,668 B2* | 3/2008 | Ilan | G06Q 30/02 348/E7.024 |
| 8,204,073 B1* | 6/2012 | Gailloux | H04M 1/7253 370/437 |
| 8,749,584 B2* | 6/2014 | Jung | H04W 4/04 345/633 |
| 2005/0105725 A1 | 5/2005 | Lee | |
| 2005/0219068 A1* | 10/2005 | Jones | G01S 5/30 341/50 |
| 2006/0066450 A1 | 3/2006 | Jackson | |
| 2006/0167595 A1 | 7/2006 | Breed et al. | |
| 2006/0230415 A1* | 10/2006 | Roeding | H04N 7/173 725/34 |
| 2007/0220544 A1 | 9/2007 | Nash-Putnam | |
| 2007/0250901 A1 | 10/2007 | McIntire et al. | |
| 2008/0140479 A1 | 6/2008 | Mello et al. | |

(Continued)

FOREIGN PATENT DOCUMENTS

WO    2011/014292    2/2011

OTHER PUBLICATIONS

R. Kim, "No Check-Ins Needed. Shopkick Sends You Deals From Your Couch", May 19, 2011, Gigaom.com; http://gigaom.com/2011/05/19/shopkick-teams-with-cw-to-make-tv-ads-active/.

(Continued)

*Primary Examiner* — Edward Urban
*Assistant Examiner* — Rui Hu
(74) *Attorney, Agent, or Firm* — K&L Gates LLP

(57) ABSTRACT

A system, methods, and apparatus for sonic signaling communication are disclosed. In an example embodiment, a broadcast device transmits a sonic signal including an audible signal component including primary information and an inaudible signal component including secondary information. The primary information is audibly transmitted from the broadcast device for reception by a user. The inaudible signal component is received by a user device configured to take an action responsive to the receipt of the secondary information.

41 Claims, 6 Drawing Sheets

(56) References Cited

U.S. PATENT DOCUMENTS

| | | |
|---|---|---|
| 2008/0057924 A1 | 8/2008 | Stewart |
| 2008/0227436 A1 | 9/2008 | Gantman et al. |
| 2009/0125956 A1 | 5/2009 | Philyaw |
| 2010/0027837 A1* | 2/2010 | Levy ................. G06F 17/30876 382/100 |
| 2010/0057590 A1* | 3/2010 | Wesby .............. G06F 17/30743 705/26.1 |
| 2010/0138012 A1 | 6/2010 | Rhoads |
| 2011/0028160 A1 | 2/2011 | Roeding et al. |
| 2011/0029359 A1 | 2/2011 | Roeding et al. |
| 2011/0029362 A1* | 2/2011 | Roeding ................ G06Q 30/00 705/14.13 |
| 2011/0029364 A1 | 2/2011 | Roeding et al. |
| 2011/0029370 A1 | 2/2011 | Roeding et al. |
| 2011/0214143 A1* | 9/2011 | Rits ................... G06F 17/30026 725/34 |
| 2012/0051187 A1* | 3/2012 | Paulson ................. H04B 11/00 367/135 |
| 2012/0075083 A1* | 3/2012 | Isaacs ............... H04M 3/42382 340/13.2 |
| 2012/0079518 A1* | 3/2012 | Wan ....................... H04H 60/45 725/14 |
| 2012/0134238 A1* | 5/2012 | Surprenant ............. H04S 1/007 367/137 |
| 2013/0048709 A1* | 2/2013 | Turner ............... G06Q 20/3272 235/375 |
| 2013/0204458 A1* | 8/2013 | Purushothaman ....... B60Q 5/00 701/1 |
| 2013/0288723 A1* | 10/2013 | Bell ...................... H04M 1/505 455/466 |
| 2014/0064499 A1* | 3/2014 | Shim ..................... H04B 11/00 381/58 |
| 2016/0088333 A1* | 3/2016 | Bhatia ................ H04N 21/252 725/34 |

OTHER PUBLICATIONS

International Search Report and Written Opinion dated Aug. 10, 2012 issued for International PCT Application No. PCT/US2012/038617.

Braun, et al., "Using Sonic Hyperlinks in Web-TV" [online]. Published in the Proceedings of the Fifth International Conference on Auditory Displays. 1998. Retrieved on Jul. 23, 2012, from the Internet at URL:<http://citeseerx.ist.psu.edu/viewdoc/summary?doi=10.1.1.105.5082>, entire document.

* cited by examiner

SONIC SIGNALING COMMUNICATION FOR USER DEVICES

BACKGROUND

Communication with electronic user devices has become a large part of everyday life. For many people, user devices such as mobile telephones, laptops, and tablet computers are an integral part of their life. Also, many people are often recipients of broadcast content provided by television and radio networks, cable companies, internet web sites, and a variety of closed circuit systems. Broadcasters of content typically strive to improve communication with recipients for a wide variety of reasons and use a wide variety of tactics to effect the desired communication improvements. Similarly, recipients of a content broadcast may desire a better content receiving experience. For example, television broadcasters may want to improve viewer reception of advertisements, while viewers may want to receive more highly relevant content from advertisements. Many systems are presently available for optimizing the available communication channels and communication techniques have been implemented by broadcasters of content, however, the current content delivery methods employed in the prior art may be further improved as presently disclosed.

SUMMARY

The present disclosure provides a new and innovative system, methods and apparatus for sonic signaling communication. In one example embodiment, a broadcast device transmits a sonic signal including an audible signal component including primary information and an inaudible signal component including secondary information. The primary information is audibly transmitted from the broadcast device for reception by a user. The inaudible signal component is received by a user device configured to take an action responsive to the receipt of the secondary information.

Additional features and advantages of the disclosed method and apparatus are described in, and will be apparent from, the following Detailed Description and the Figures.

DETAILED DESCRIPTION OF EXAMPLE EMBODIMENTS

The present disclosure relates in general to a communication system and, in particular, to a system, methods, and apparatus for communication using sonic signaling. Briefly, in an example embodiment, a system is provided which transmits a message from a traditional broadcast to a user device using wireless communication. For example, a television wirelessly sends data to a user and a mobile phone using sonic signaling. In one example embodiment, the sonic signaling may include a signal portion that is within a frequency range that is inaudible to a typical human, but can be understood by the mobile phone. It should be appreciated that humans above the age of eight are generally unable to sense sounds above approximately 18 kHz, but microphones in user devices can typically detect frequencies of up to 22.05 kHz or 24 kHz. Also, broadcast device speakers, even cheaper commodity speakers or stock speakers, can typically produce sounds above 20 kHz. Accordingly, the sonic signaling may include an audible portion for humans and an inaudible portion recognizable by machines but not within the normal hearing range of a typical human.

In an example embodiment, the broadcast device (e.g., a television) may be playing an advertisement which is part of the programming content (e.g., a television show), and the sonic signal broadcast by a speaker includes an audible track, such as music and a voiceover, and an inaudible data signal which is received by a microphone of a user device (e.g., mobile phone). The user hears the audible track and the user device performs an action based on the received inaudible machine signal, such as displaying a text message, providing rewards points to the user, accessing a web page, or storing a coupon. In a preferred embodiment, a machine signal intended for reception at the user device is entirely inaudible to humans. As further discussed below, it should be appreciated that the disclosed sonic signaling communication provides many benefits to content providers and broadcasters of content as well as recipients of broadcasted content.

Figure 1:
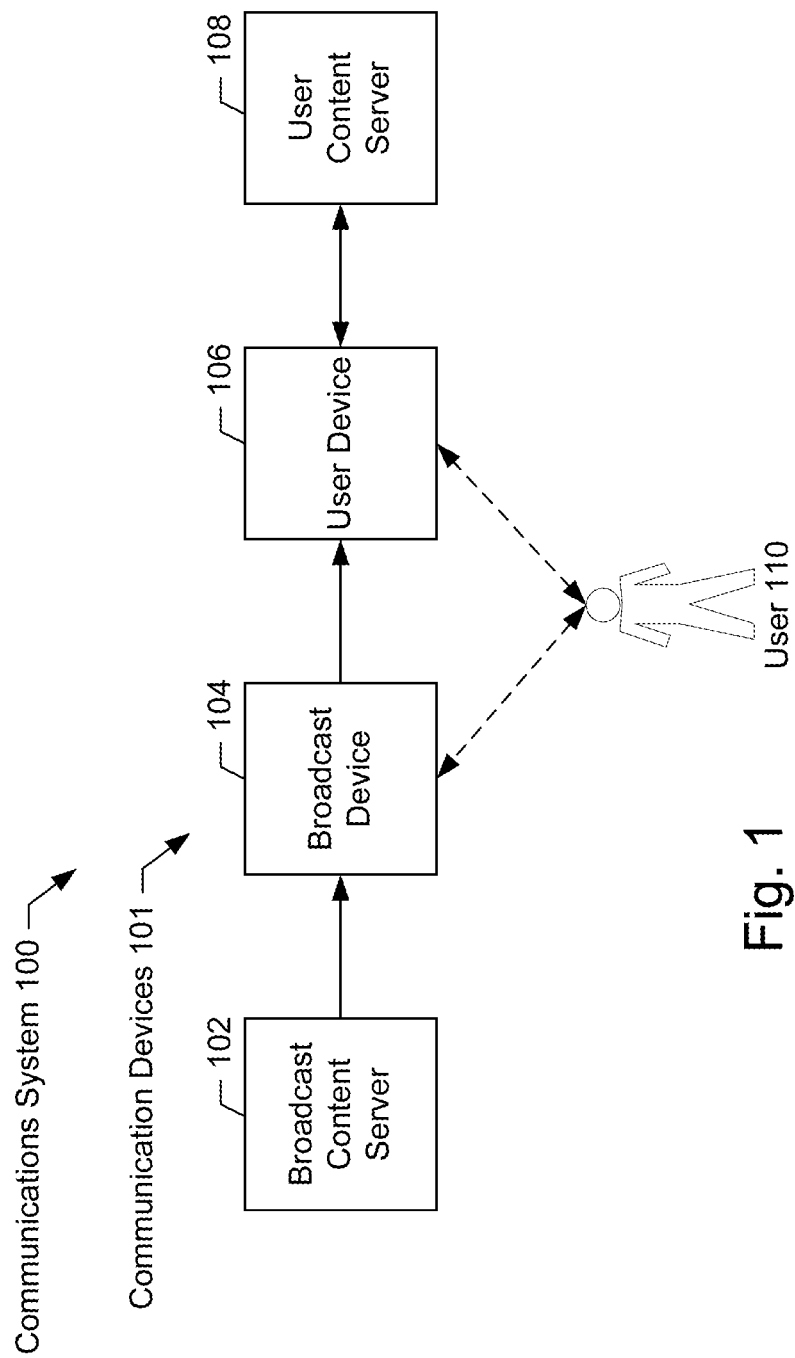
FIG. 1 is a high level block diagram of an example communication system, according to an example embodiment of the present disclosure.

A high level block diagram of an example communication system 100 is illustrated in FIG. 1. The illustrated example communication system 100 includes a plurality of communication devices 101, including a broadcast content server 102, a broadcast device 104, a user device 106, and a user content server 108.

A broadcast content server 102 may be, for example, a content server of a television broadcasting network, a radio broadcasting network, a web site, a movie production company, or any type of closed system video and/or audio providing service. A broadcast content server 102 may be a high end computer with a large storage capacity, one or more fast microprocessors, and one or more components for broadcasting content via a variety of mediums. A broadcast content server 102 may be configured according to a particular operating system, application, memory, hardware, transmitter, etc., and may provide various options for managing the execution of broadcasting programs and applications, as well as various administrative tasks.

A broadcast device 104 may be, for example, a television, a radio or stereo system, a movie theater system, a closed circuit video and/or audio system, a desktop computer, a laptop computer, a tablet computer, a smartphone, etc. A broadcast device 104 typically receives data representing an audio and/or visual broadcast via a signal (e.g., radio frequency signal, cable signal, satellite signal, IPTV signal) or a computer readable medium (e.g., CD, DVD, memory card). A broadcast device 104 broadcasts content for user consumption, typically including video content and/or audio content. For example, a television may display programming images from a network broadcaster or a DVD, while also actuating one or more speakers for an audible portion of the programming. A user 110 may watch the visual portion of the programming and listen to the audible portion of the programming. It should be appreciated that a broadcast device 104 may include multiple components (e.g., screen, set top box, digital video recorder, speakers), typically connected with wires. It should also be appreciated that data received as a broadcast signal may be temporarily stored on a computer readable medium (e.g., random access memory).

A user device 106 may be, for example, a mobile device, such as a cellular telephone, a personal digital assistant or PDA, a smartphone, a laptop, a tablet computer, or a desktop computer, as well as any other user devices. The user device 106 is used by a user 110 for any of a wide variety of tasks or functions, including business uses and recreational uses. The user device 106 typically includes, for example, a display, a speaker, and a microphone. Typically, a microphone would receive voice signals from a user or some other sonic signals which a user would wish to record. The user device 106 may have a connection to one or more communications channels such as the Internet or some other voice and/or data network, including, but not limited to, any suitable wide area network or local area network.

A user content server 108 may be, for example, a web server that receives a shortened uniform resource locator ("URL") and serves a web page to a user 110 by processing the shortened URL to return a web page. For example, a customized web page may be provided to a user 110 based on identifying information from the user device 106 which allows the user content server 108 to provide a customized experience for the user 110. Also, for example, a user content server may generate an email message or SMS text message to the user 110. A user content server 108 may be a high end computer with a large storage capacity, one or more fast microprocessors, and one or more high speed network connections. A user content server 108 may be configured according to a particular operating system, application, memory, hardware, network, etc., and may provide various options for managing the execution of programs and applications, as well as various administrative tasks. A user content server 108 typically stores one or more of a plurality of files, programs, databases, and/or web pages in one or more memories for use by user devices 106.

It should be appreciated that the example communications system 100 is illustrated using a single device for each stage of the communication system, however, the illustrated devices may be representative of a plurality of devices. For example, the communications system 100 may include a plurality of different broadcast content servers 102, a plurality of different broadcast devices 104, a plurality of different a user devices 106, and/or a plurality of different user content servers 108. For example, a single broadcast content server 102 may communicate with many broadcast devices 104, and a single broadcast device 104 may communicate with many broadcast content servers 102 and/or many user devices 106. Likewise, for example, a single user device 106 may communicate with many broadcast devices 104 and/or many user content servers 108, and a single user content server 108 may communicate with many user devices 106. Further, for example, a broadcast content server 102 and a user content server 108 may communicate with each other. In an example embodiment, a single server system may perform the functions of the broadcast content server 102 and the user content server 108.

Figure 2:
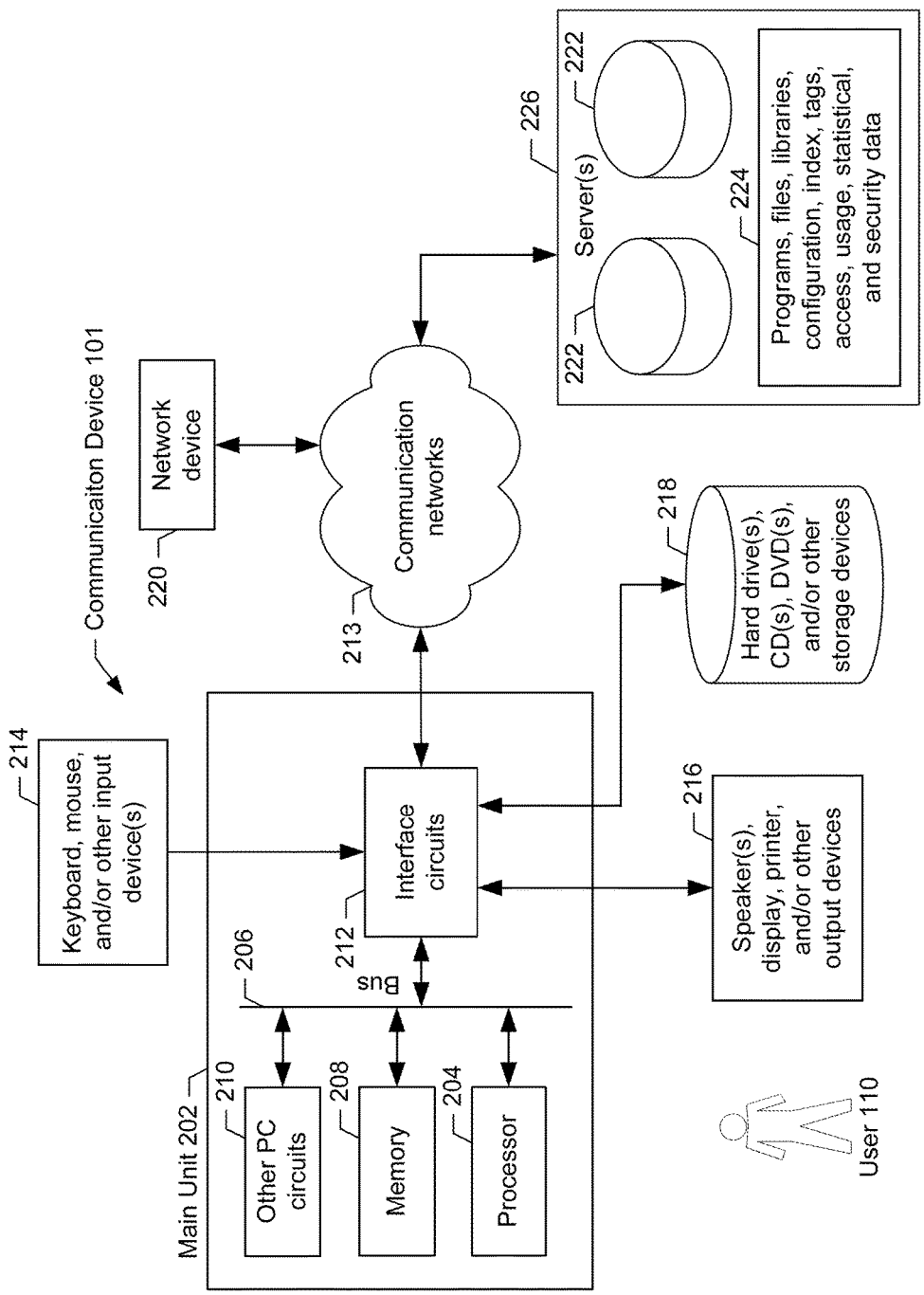
FIG. 2 is a detailed block diagram showing an example of a communication device, according to an example embodiment of the present disclosure.

A detailed block diagram of the electrical systems of an example communication device 101 is illustrated in FIG. 2. In this example, the communication device 101 includes a main unit 202 which preferably includes one or more processors 204 electrically coupled by an address/data bus 206 to one or more memory devices 208, other computer circuitry 210, and one or more interface circuits 212. The processor 204 may be any suitable processor, such as a microprocessor from the INTEL PENTIUM® family of microprocessors. The memory 208 preferably includes volatile memory and non-volatile memory. Preferably, the memory 208 stores a software program that interacts with the other devices in the communication system 100 as further described below. This program may be executed by the processor 204 in any suitable manner. The memory 208 may also store digital data indicative of documents, files, programs, web pages, etc. received from a communication device 101. Other computer circuitry 210 may include a wide variety of hardware components including ASICs, or other specialized circuitry for manipulating data in a specific format, such as streaming video data.

The interface circuits 212 may be implemented using any suitable interface standard and/or protocol including, for example, an ATSC interface, a WiFi interface, a Bluetooth interface, an Ethernet interface and/or a Universal Serial Bus interface. The interface circuits may interact with one or more communication networks 213, as well as one or more local components. It should be appreciated that many communication devices 101 may have multiple interface channels which may be used simultaneously or alternatively used. One or more input devices 214 may be connected to the interface circuits 212 for entering data and commands into the main unit 202. For example, the input devices 214 may be a keypad, keyboard, mouse, touch screen, track pad, track ball, isopoint, remote controller, and/or a voice recognition system.

One or more speakers, displays, printers, and/or other output devices 216 may also be connected to the main unit 202 via the interface circuits 212. The speaker may include a single speaker or a multi-speaker system. The display 112 may be a liquid crystal display or any other type of display. The speaker and display may generate an audio-visual content for a user 110 or administrator during operation of the communication devices 101. For example, the output devices 216 may act as a user interface that provides one or more web pages received from a communication device 101. A user interface may also include prompts for human input from a user 110 via input devices 214 including links, buttons, tabs, checkboxes, thumbnails, text fields, etc., and may provide various outputs in response to the user inputs, such as still images, videos, audio, animations, and text.

One or more storage devices 218 may also be connected to the main unit 202 via the interface circuits 212. For example, a hard drive, CD drive, DVD drive, and/or other storage devices may be connected to the main unit 202. The storage devices 218 may store any type of data, such as image data, video data, audio data, tagging data, historical access or usage data, statistical data, security data, etc., which may be used by the communication device 101. A storage device 218 may be manufactured as a mass produced item, be custom generated and/or be modified by a communication device 101.

The communication device 101 may also transmit, receive, or exchange data with other network devices 220 via a communication network 213. A network device 220 may be a different communication device 101 as illustrated in FIG. 1, or any other device accessible via a communication network 213. Network devices 220 may include one or more servers 226, which may be used to store certain types of data, and particularly large volumes of data, for example, video data stored in one or more data repository 222.

However, a server 226 may include any kind of data 224 including programs, files, libraries, configuration data, index or tagging data, historical access or usage data, statistical data, security data, etc. A server 226 may store and operate various applications relating to receiving, transmitting, processing, and storing the large volumes of data. It should be appreciated that various configurations of one or more servers 226 may be used to support and maintain the communication system 100. Also, certain data may be stored in a communication device 101 which is also stored on the server 226, either temporarily or permanently, for example in memory 208 or storage device 218. The network connection may be any type of network connection, such as a cellular or wireless connection, an Ethernet connection, digital subscriber line, telephone line, coaxial cable, etc. Access to a communication device 101 can be controlled by appropriate security software or security measures. An individual users' 110 access can be defined by the communication device 101 and limited to certain data and/or actions. Accordingly, users 110 and/or administrators of the communication system 100 may be required to register with one or more communication device 101. For example, registered users 110 or administrators may be able to manipulate data, such as by storing, editing, tagging, uploading, transmitting data or video content, rating content, suggesting content to other users 110, etc.

As noted previously, various options for managing data located within a communication device 101 and/or in a server 226 may be implemented. A management system may manage security of data and accomplish various tasks such as facilitating a data backup process. A management system may be implemented in communication device 101 and/or in an external server 226. Accordingly, the management system may update, store, and back up data locally and/or remotely using any suitable method of data transmission, such as the Internet or any other communication network 213.

Figure 3:
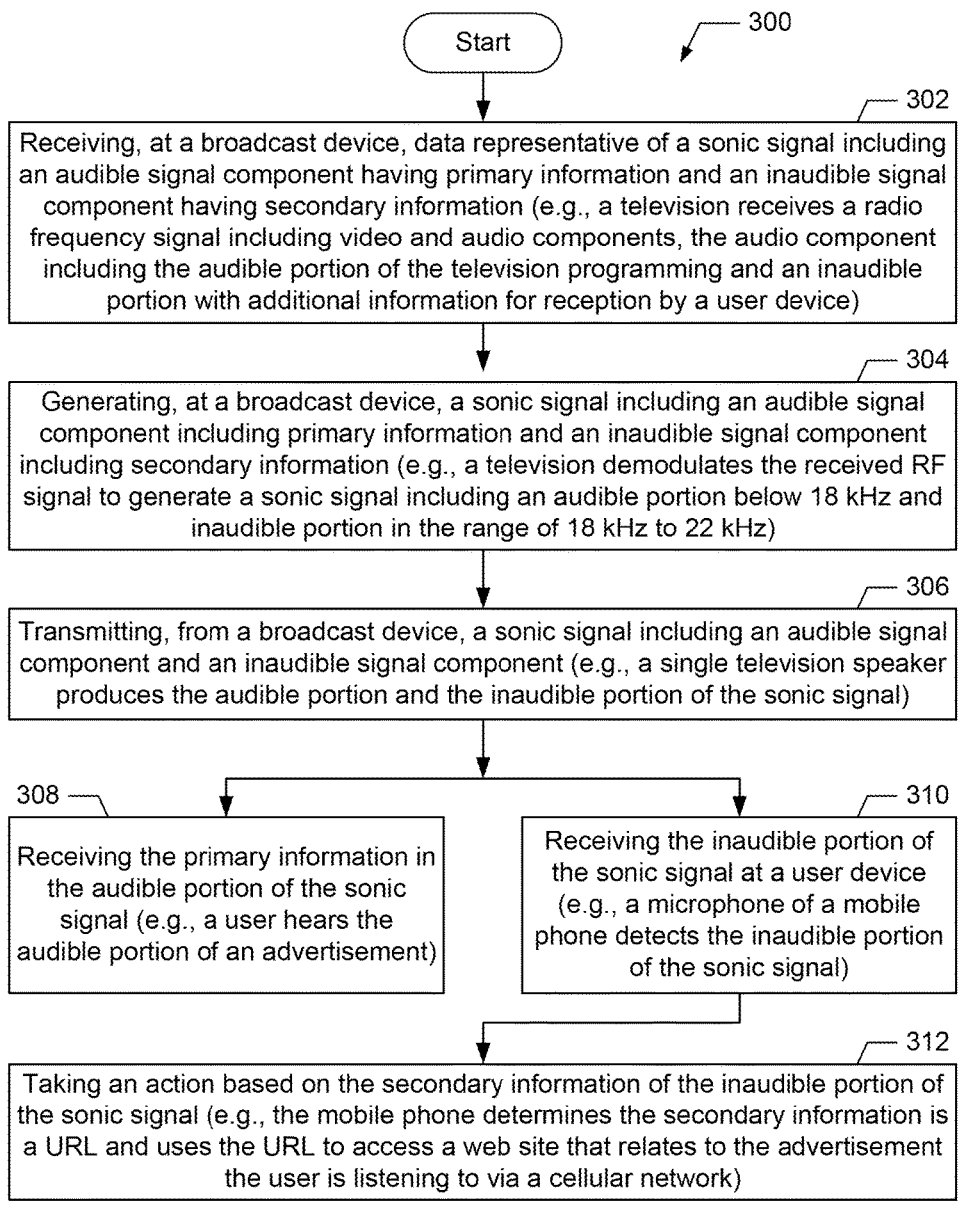
FIG. 3 includes a flowchart illustrating an example process for sonic signaling communication, according to an example embodiment of the present disclosure.

FIG. 3 is a flowchart of an example process 300 for providing sonic signaling communication. Although the process 300 is described with reference to the flowchart illustrated in FIG. 3, it will be appreciated that many other methods of performing the acts associated with the process 300 may be used. For example, intervening processes or sub-processes may occur, the order of some of the blocks may be changed, and some of the blocks described are optional.

The example process 300 may begin with receiving, at a broadcast device, data representative of a sonic signal including an audible signal component having primary information and an inaudible signal component having secondary information (block 302). For example, a television receives a radio frequency ("RF") signal including video and audio components, the audio component including the audible portion of the television programming and an inaudible portion with additional information for reception by a user device. Typically, a broadcast device 104 may automatically demodulate and/or decode data which was previously modulated and/or encoded by a broadcaster of content or content distributor to broadcast the content to users 110. It should be appreciated that a television, or any other broadcast device 104, may receive signals to broadcast content using any one of a variety of standard formats or protocols including signals received via cables from a computer readable medium instead of via RF communication. The primary information may include any audible content which may be presented to the user, while the secondary information may include any additional content which may be received by the user device 106. For example, secondary information could include a text string, a URL, a shortened URL, or any other type of message only subject to the amount of data being delivered in the secondary information, which may be bound by technical considerations. It should be appreciated that a message may be broken down into subparts to be communicated as secondary information over time.

Once the data representative of the sonic signal has been received, the example process 300 may continue with generating, at a broadcast device, a sonic signal including an audible signal component including primary information and an inaudible signal component including secondary information (block 304). For example, a television may demodulate the received RF signal to generate a sonic signal including an audible portion below 18 kHz and an inaudible portion in the range of 18 kHz to 22 kHz. It should be appreciated that an inaudible portion as used herein refers to a sonic signal that is generally inaudible to typical human being over the age of eight years old. A signal may be inaudible because it is of a frequency which is not within the typical hearing range, or because the amplitude of the signal is too low, or a combination of these factors. To the extent that a human would be able to hear the machine signal which carries the secondary information, it is preferable for many applications that the noise heard would be minimally noticeable so as to not destroy the user's 110 ability to receive the primary information provided in the sonic signal. In an example embodiment, a user 110 may be able to hear a machine signal which includes secondary information and is generally audible. However, there are a variety of techniques which may be employed to provide the secondary information inaudibly, as discussed in further detail below. Also, it should be appreciated that demodulation of RF signals or other inputs to a television may follow various standards and protocols. Typically, an audio signal is generated or converted into in a standard format which is useable by a television. An audio signal may be stored in any format including, for example, MP2, MP3, AC-3, AAC, or HE-AAC.

The example process 300 may continue with transmitting, from a broadcast device, a sonic signal including an audible signal component and an inaudible signal component (block 306). For example, a single television speaker produces the audible portion and the inaudible portion of the sonic signal. It should be appreciated that a sonic signal is typically transmitted by actuating a speaker to propagate the sonic signal through the air to a receiver (e.g., human ear, microphone). A single television speaker may be a commodity speaker, or stock speaker, which is included in the television. Alternatively, more than one speaker may be used, for example, current televisions are typically used with multiple speakers and may provide a stereo or other multi-speaker surround sound arrangement. For example, a television may transmit the received visual and audio signals of a programming signal from a network broadcast company in the standard manner, for example, by demodulating and/or decoding data which has been modulated and/or encoded in an RF signal for display on a screen and transmission through a speaker.

Next, the example process 300 may continue with receiving the primary information in the audible portion of the sonic signal (block 308). For example, a user 110 hears the audible portion of an advertisement. The primary information may be any information which would normally be presented in audible form to a user 110 listening to the broadcast device 104.

In response to the transmission of the sonic signal, the example process 300 may continue with, receiving the inaudible portion of the sonic signal at a user device (block 310). For example, a microphone of a mobile phone detects the inaudible portion of the sonic signal, for example, during an advertisement. The inaudible portion of the sonic signal may then be stored and deciphered in the mobile phone. In an example embodiment, the inaudible sonic signal may be provided during normal program content as opposed to a commercial break, for example, in relation to a product placement.

The mobile phone may have an application which periodically polls the microphone to check for the presence of sound waves, for example, in the 18 to 22.05 kHz range. If found, the software may demodulate and/or decode the inaudible portion of the sonic signal in reverse to the prior modulation and/or encoding of the secondary information as the inaudible sonic signal. For example, the secondary information may be modulated using spread spectrum techniques, such as frequency-hopping spread spectrum (FHSS) or direct-sequence spread spectrum (DSSS). Using spread spectrum techniques may allow for weaker signals to be received by using a wider bandwidth. In an alternative example embodiment using spread spectrum techniques, one or more frequencies below 18 kHz may be used in the inaudible signal component of the sonic signal. It should be appreciated that, even though these frequencies are audible to most humans, the use of spread spectrum techniques may mask the machine signal. For example, using spread spectrum techniques may allow for use of lower power levels than would be perceivable by a human who is simultaneously listening to an audible signal.

Next, example process 300 may proceed with the user device 106 taking an action based on the secondary information of the inaudible portion of the sonic signal (block 312). For example, the mobile phone determines the secondary information is a URL and uses the URL to access a web site that relates to the advertisement the user is listening to via a cellular network. The user device 106 may be programmed to take a wide variety of actions, including displaying a visual or audible message to the user 110 immediately or at a later time, opening or accessing an application, storing data in local or remote memory, etc. The user device 106 may take an action without communicating with any other device, for example, the user device 106 may simply display a text message to the user 110. In an example embodiment, the user device 106 does not display anything to the user 110, but may update a user account, such as a rewards points account. For example, if a user watches a television program, awards points or rewards points may be awarded during the television programming. In an example embodiment, the points may only be awarded if the user device receives the secondary information from the sonic signal which is provided during commercial advertisements. Also, it may be preferable to broadcasters of content that viewers or listeners receive the programming in real-time. In an example embodiment, the secondary information may need to be received by the user device 106 in real-time in order to provide any benefit to the user 110.

It should be appreciated that the example process 300 may be ongoing continuously or intermittently. For example, sonic signal components including secondary information may be sent occasionally during the course of a television program. In an example embodiment, each commercial advertisement may have secondary information which is transmitted during the advertisement. It should be appreciated that the duration of the transmission of the secondary information may be based on the amount of data sent and other factors. For example, a message may be sent many times within a short period of time to ensure the user device 106 can reliably receive the message.

Figure 4:
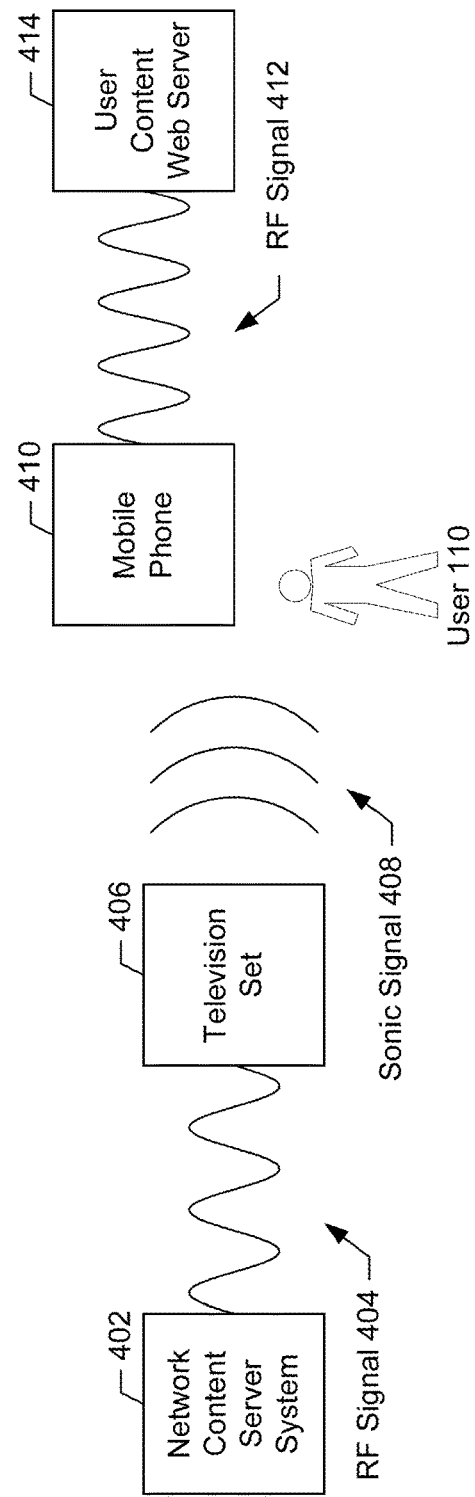
FIG. 4 is a high level block diagram of an example communication system, according to an example embodiment of the present disclosure.

A high level block diagram of an example communication system 400 is illustrated in FIG. 4. The illustrated example communication system 400 includes a plurality of communication devices 101, including a network content server system 402, a television set 406, a mobile phone 410, and a user content web server 414.

The network content server system 402 could be a television broadcast station server storing television programming including commercial advertisements, promotional material, and the like. The network content server system 402 may include servers storing content and programming data, equipment for modulating and transmitting a broadcast signal with video and audio signal components, for example, including an encoder and a broadcast antenna. It should be appreciated that video and audio data can be transmitted using standard RF communication formats and protocols which are known in the industry.

The network content server system 402 may add the audible portion of a program to a data signal which includes secondary information. For example, the secondary information is a message for a user 110, which may include a character string which is digitally encoded as a series of bits, which is modulated as an inaudible signal. Encoding and/or modulating of secondary information may be performed using a black box service. A URL which may be encoded and modulated according to a predefined protocol and added to an audible signal with primary information, to form a sonic signal which when reproduced by a broadcast device 104, such as television set 406, will transmit an audible portion including primary information and an inaudible portion including secondary information. A black box service might begin its processing by shortening a URL using a service such as Bit.ly™. The resulting shortened URL may be converted into a binary format which may be modulated according to any of a variety of techniques to generate an audio file. A spread spectrum modulation technique may be preferred for certain applications, because increased security may be attainable with reception of relatively weaker signals. Accordingly, the audio file may include one or more ultrasonic frequencies and may be stored in a variety of formats. A black box service may be provided, for example, entirely by a third party, performed on a third party server, or may be performed entirely within the network content server system 402. Once the network content server system 402 has generated a signal to transmit, the signal may be transmitted as an RF signal 404.

The television set 406 may receive and process RF signal 404 using standard techniques and processes. For example, the RF signal 404 may be demodulated to provide video and audio components. It should be appreciated that an RF signal may be transmitted via a variety of mediums (e.g., air, fiber optic cable, coaxial cable). It should also be appreciated that a television signal may be a digital data signal that is not an RF signal (e.g. TCP/IP data packets, FiOS). The television set 406 may display the video signal on a screen and produce a sonic signal 408 using a speaker. The sonic signal 408 may include an audible portion which may be heard by a user 110, and an inaudible portion which may be received by a mobile phone 410. The television set 406 may supplement or modify the inaudible sonic signal component received by the network content server system 402. For example, if the inaudible sonic signal includes secondary information which is customizable, the television set 406, or any other broadcast device 104, may insert or embed additional data into the inaudible sonic signal prior to transmission to the mobile phone 410, or any other user device 106. If an inaudible sonic signal includes a variable which allows for custom information to be inserted, and no custom information is available, a stock message may be provided in the inaudible sonic signal. Also, the television set 406 may insert an inaudible signal component if no inaudible sonic signal component is received from the network content server system 402. For example, an advertisement for the television brand or manufacturer may occasionally be transmitted via an inaudible sonic signal.

The mobile phone 410 may be, for example, the user's 110 cellular phone or laptop computer. As discussed above, a mobile phone 410 may check for an inaudible sonic signal using an application, for example, by periodically polling the microphone. It should be appreciated that similar software may run on any mobile phone 410 that has an operating system that allows access to a microphone (e.g., iOS, Android, Blackberry OS, webOS, Windows Phone 7, Symbian). Software running on the mobile phone 410 may be a native application or a third-party application developed using libraries developed for use with the mobile phone 410. In the latter case, a "white label" application may be created or a software development kit may be distributed for implementing the system.

Once an inaudible sonic signal is detected, software on the mobile phone 410 may attempt to demodulate the inaudible sonic signal using the reverse process of the modulating technique used. If an inaudible sonic signal is successfully demodulated, the resulting signal may represent the binary form of the input information, for example, a shortened URL. If only a unique key portion of a URL has been transmitted, a full URL may be recreated, for example, by prepending a protocol and domain name to the unique key. In order to allow for message customization, the software on the mobile phone 410 may optionally append unique identifiers to a recreated URL. In an example embodiment, a user ID, a geolocation coordinate, and/or a device ID may be appended to the URL in the form of URL parameters. The full URL may then be sent to a user content web server 414, for example, as a mobile data connection or a WiFi connection illustrated as RF signal 412. Optionally, a request, for example, a URL or shortened URL, may be transmitted using a secure protocol such as HTTPS. Further, in an example embodiment, the mobile phone 410 may not send any requests to external devices or servers, and may provide a user 110 with user content from memory or the data received in an inaudible sonic signal.

The user content web server 414 receive a request from a mobile phone 410, or any user device 106. For example, the user content web server 414 may receive a shortened URL, expand the URL, and then return the response to the mobile phone 410. For example, if a request was made for a website, the mobile phone 410 may launch a browser to display the website page. In an example embodiment, the resource identified by a URL may be a web service, and the data returned to a mobile phone 410 may be processed before being displayed to the user 110. In an example embodiment, third party applications may be launched by the mobile phone 410. A user content web server 414 may perform a wide variety of tasks based on the received RF signal 412, and accordingly, may be usefully implemented to provide substantial benefits to users 110. For example, the user content web server 414 may provide customized content, for example, rewards points may be credited to a user account and a customized message may be returned to the mobile phone 410.

It should be appreciated that if the mobile phone's 410 reception of the sonic signal 408 is impeded by obstructions between the television set 406 and the mobile phone 410, the sonic signal 408 may not be reliably received. For example, the mobile phone 410 may have trouble receiving the inaudible component of the sonic signal 408 if the mobile phone 410 is in the user's 110 pocket. It should be appreciated that the robustness of the system may be modified or adjusted based on the application at hand.

Figure 5:
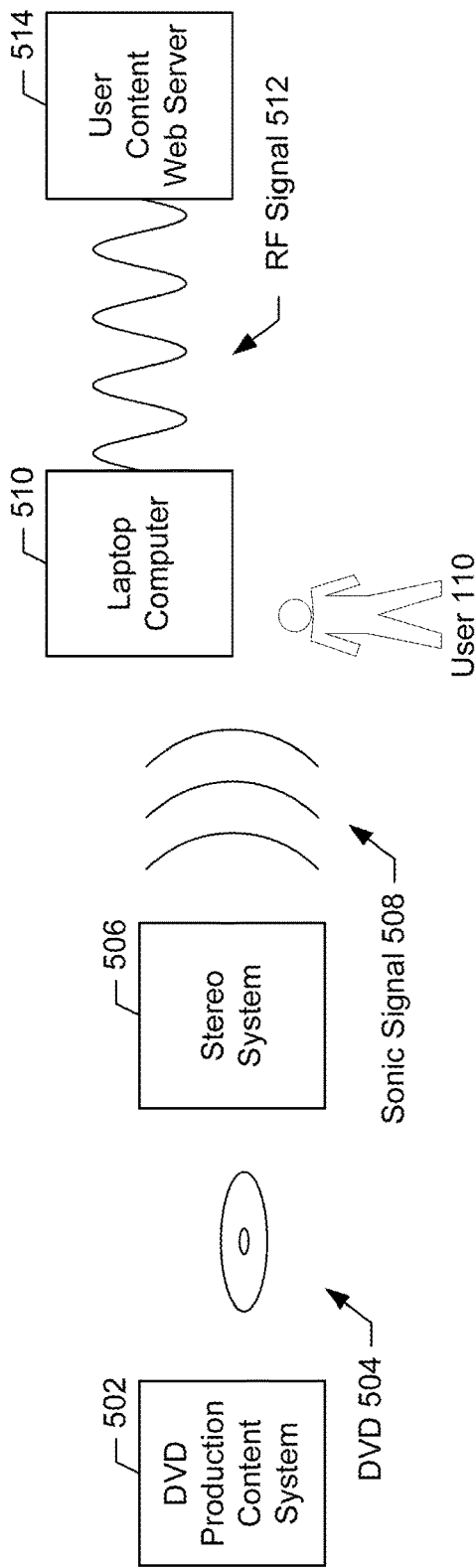
FIG. 5 is a high level block diagram of an example communication system, according to an example embodiment of the present disclosure.

A high level block diagram of an example communication system 500 is illustrated in FIG. 5. The illustrated example communication system 500 includes a plurality of communication devices 101, including a DVD production content system 502, a stereo system 506, a laptop computer 510, and a user content web server 514. These communication devices 101 are similar to the exemplary network content server system 402, television set 406, mobile phone 410, and user content web server 414, which were described above in relation to FIG. 4.

The DVD production content system 502 may produce a DVD 504 including content such as movies, music, video games, software, etc. An audio file stored on a DVD 504 may have an inaudible signal with secondary information added to the primary audio information. For example, a movie stored on a DVD 504 may include an advertisement or message relating to a new sequel. For example, a music DVD 504 may include artist and track information which may be transmitted with the music. Also, a DVD 504 may include software which may be run locally at a broadcast device, for adding an inaudible signal to an audible signal as described above. It should be appreciated that the DVD production content system 502 may produce computer readable media, other than DVDs 504, for performing the disclosed sonic signaling methods.

The stereo system 506 may receive audio signals from a DVD 504 to provide sound for a movie or to play music, or the like. Similar to the television set 406 described above, the stereo system 506 may process an audio signal to produce a sonic signal 508, which includes an audible sonic signal component and an inaudible sonic signal component. It should be appreciated that the stereo system 506 may additionally or alternatively receive an audio signal from any other data source (e.g., FiOS). The stereo system 506 may supplement or modify the inaudible sonic signal component to customize a message for a user 110.

The laptop computer 510 may receive the inaudible sonic signal component of the sonic signal 508. For example, the laptop computer 510 provides the user 110 with information, such as the artist and track title of a currently playing song. Similar to the mobile phone 410, the laptop computer 510 may send a request to a user content web server 514. The user content web server 514 may receive, via an RF signal 512, a request or message from the laptop computer 510. In response, the user content web server 514 may send a message, web page, data file, or request to open an application to the laptop computer 510, for presentation to a user 110. Similarly, the laptop computer 510 may send a response signal to a stereo 506, or another broadcast device 104. For example, the response signal may include a confirmation that an inaudible sonic signal was received by the laptop computer 510.

In addition to a DVD production content system 502, or a network content server system 402, many content producers may employ the disclosed sonic signaling communication system. For example, closed circuit content providers may provide content in a similar manner as discussed above. For example, in a grocery store or at a bus stop, a dedicated speaker may be providing music or spoken information to users 110. These types of content providing systems may provide machine signals to user devices 106, including inaudible signals, by supplementing audible signals that are already being transmitted during the normal course of business. Virtually any type of business or service may utilize the disclosed sonic signaling for communication and/or advertising purposes.

Figure 6:
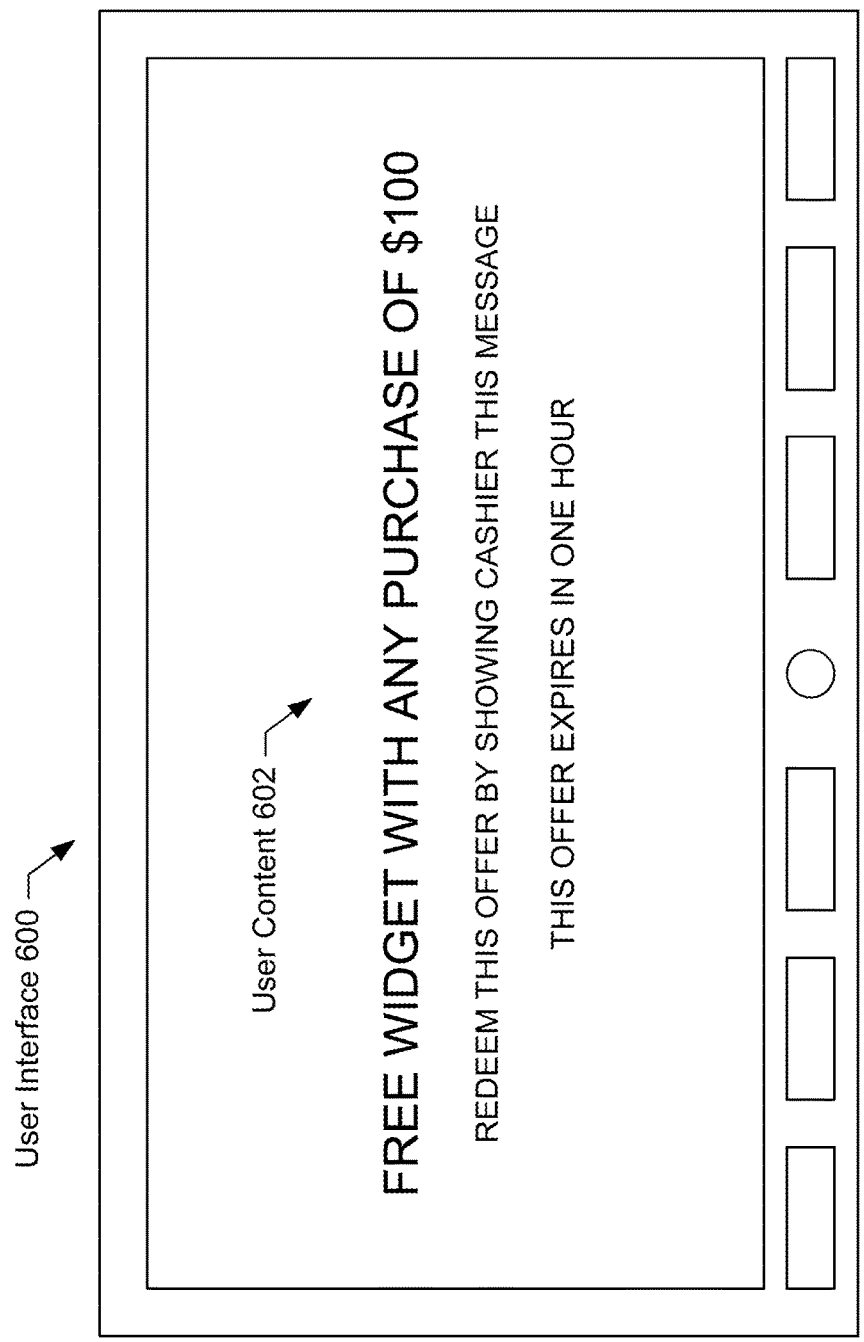
FIG. 6 provides an illustration of an example user interface displaying user content, according to an example embodiment of the present disclosure.

FIG. 6 provides an example user interface 600 displaying example user content 602 via a user device 106. In this example, the example user interface 600 is illustrated as text message which displays an advertisement which may include a special offer for the user 110. For example, a user 110 may be walking through a store when an inaudible sonic signal is transmitted from an overhead speaker which is also playing music. The inaudible sonic signal may provide the illustrated message to the user 110. For example, the user content 602 may be time limited and may be customized to the user based on a user profile.

In an example embodiment, an inaudible sonic signal includes a shortened URL, which is used to access a web page which may provide for an increased level of detail, such as images, animations, videos, audio, etc. For example, a coupon including a bar code may appear on a user's 110 smartphone, which may then be scanned at the register of a grocery store. In an example embodiment, the user interface 600 may display a wide range of messages to the user including, for example, emergency notification information, news bulletins, invitations to events, interesting trivia, donation requests, etc. Typically, a web browser may be used to display a web page on the user interface 600. It should be appreciated that a user interface 600 may be implemented using a visual display of information, audio communication, or any other output stimuli, as well as allowing a user 110 to provide input for an improved user experience. For example, a web page may include an interactive game or allow a user to instantly purchase items, win prizes, interact with a social network, or the like. Also, for example, a printer may print a coupon, directions to a specified location, or some other message for the user 110. It should be appreciated that coupon distribution may be performed selectively by targeting specific users 110 using various filters or algorithms to determine a coupon distribution.

It should be appreciated that broadcasters of content, including advertisers, may take advantage of the sonic signaling communication system disclosed herein in a wide variety of ways to increase the effectiveness of marketing, customer awareness and loyalty, and the like. Also, users 110 may set controls as to the type of user content 602 delivered via a user device 106, for example, with settings on the user device 106 or at a web site for controlling content by opting in or opting out of receiving certain user content 602. Further, allowing access to third parties may require user 110 consent. For example, an inaudible sonic signal which requests that a user access a URL may require user approval, and should the user 110 not approve the access of the user content 602 at the URL, a text message or other message which may be a subset of the full message may be provided on the user device 106. Additionally, a message for a user may invoke a social media (e.g., Twitter), which may introduce a viral coefficient into the system.

It will be appreciated that all of the disclosed methods and procedures described herein can be implemented using one or more computer programs or components. These components may be provided as a series of computer instructions on any conventional computer-readable medium, including RAM, ROM, flash memory, magnetic or optical disks, optical memory, or other storage media. The instructions may be configured to be executed by a processor, which when executing the series of computer instructions performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a broadcast device receiving an audible signal component and an inaudible signal component from a base station, and transmitting a sonic signal by propagating the sonic signal through the air as sound waves, the sonic signal including (i) the audible signal component which includes primary information and (ii) the inaudible signal component which includes secondary information that is customized for a user based on a user profile by the broadcast device by inserting or embedding additional customization data to said inaudible signal component, wherein the inaudible signal component is associated with a specific portion of the audible signal component that is transmitted,
wherein the primary information is audibly transmitted from the broadcast device for reception by the user, and
wherein the inaudible signal component of the sonic signal propagated through the air is received as sound waves by a user device configured to take an action responsive to the receipt of the secondary information customized for the user based on the user profile, wherein taking the action is conditioned upon the user device detecting the inaudible signal component with the specific portion of the audible signal component.

2. The system of claim 1, wherein the inaudible signal component is within the range of 18 kHz to 24 kHz.

3. The system of claim 1, wherein the inaudible signal component is at least one of a frequency-hopping spread spectrum modulated signal and a direct-sequence spread spectrum modulated signal.

4. The system of claim 1, wherein the audible signal component is an audible portion of one of a television broadcast, a radio broadcast, a movie broadcast, a podcast, a webcast, and a closed circuit broadcast.

5. The system of claim 4, wherein the inaudible signal component is only transmitted when the audible signal component is in real-time format.

6. The system of claim 1, wherein the broadcast device includes a common speaker that transmits the audible signal component and the inaudible signal component.

7. The system of claim 6, wherein the common speaker is at least one of a stock television speaker, a stock radio speaker, and a stock computer speaker.

8. The system of claim 1, wherein the secondary information includes at least one of an advertisement, an offer, and a coupon.

9. The system of claim 1, wherein the secondary information includes rewards points which are credited to a user account.

10. The system of claim 1, wherein the secondary information allows the user to obtain rewards points which are credited to a user account.

11. The system of claim 1, wherein the secondary information includes a uniform resource locator.

12. The system of claim 11, wherein the uniform resource locator is a shortened uniform resource locator.

13. The system of claim 1, wherein the secondary information requests the user device to open an application.

14. The system of claim 1, wherein the secondary information includes at least one of real-time information and emergency information.

15. The system of claim 1, wherein the secondary information includes at least one of a visual message and an audible message that is provided to the user by a graphical user interface on the user device.

16. The system of claim 1, wherein the broadcast device is at least one of a television, a radio, an MP3 player, a desktop computer, a laptop computer, a tablet computer, a movie theater device, a mobile phone, and a personal digital assistant.

17. The system of claim 1, wherein the user device displays user content including text characters.

18. The system of claim 1, wherein the user device transmits a response inaudible signal component to the broadcast device.

19. The system of claim 1, further comprising: A device comprising: a microphone to receive the inaudible signal component of the sonic signal propagated through the air as sound waves from the broadcast device; and a processor operably coupled to the microphone, the processor executing instructions to process the secondary information to cause the device to take the action.

20. The device of claim 19, further comprising a transmitter for transmitting a response inaudible signal component to the broadcast device.

21. The system of claim 1, further comprising:
a receiver to receive from a user device, over a network, data representative of the secondary information included in the inaudible signal component of the sonic signal transmitted by propagating the sonic signal through the air as sound waves from the broadcast device;
a processor operably coupled to the receiver;
a memory device storing instructions which when executed by the processor, cause the processor to generate user content based on the received data representative of the secondary information; and
a transmitter operably coupled to the processor to transmit, over the network, the user content to the user device, wherein the user content is received by the user device, which is configured to take an action responsive to the receipt of the user content.

22. The system of claim 21, wherein the user content includes an internet web page.

23. The system of claim 21, wherein the user content indicates that rewards points are credited to a user account.

24. The system of claim 21, wherein the user content requests the user device to open an application.

25. The system of claim 1, wherein the secondary information is customized for the user based on identifying information associated with the user that is received from the user device.

26. A method comprising: generating a radio frequency signal representative of a sonic signal including (i) an audible signal component which includes primary information and (ii) an inaudible signal component which includes secondary information, wherein the inaudible signal component is associated with a specific portion of the audible signal component that is generated; transmitting the radio frequency signal representative of the sonic signal to a broadcast device from a base station; and receiving the audible signal component and the inaudible signal component by the broadcast device, the received audible signal component and inaudible signal component cause the broadcast device to: customize the secondary information by inserting or embedding additional customization data into said inaudible signal component which includes the secondary information; generate the sonic signal based on the radio signal representative of the sonic signal; and transmit the sonic signal from the broadcast device by actuating a speaker to propagate the sonic signal through the air as sound waves, wherein the primary information is audibly transmitted from the broadcast device for reception by a user, and wherein the inaudible signal component of the sonic signal propagated through the air is received as sound waves by a user device configured to take an action responsive to the receipt of the secondary information customized for the user based on a user profile, wherein taking the action is conditioned upon the user device detecting the inaudible signal component with the specific portion of the audible signal component.

27. The method of claim 26, wherein the radio frequency signal is within the range of 500 kHz to 300 GHz.

28. The method of claim 27, wherein generating the sonic signal includes demodulating the radio frequency signal.

29. A method comprising: generating data representative of a sonic signal including (i) an audible signal component which includes primary information and (ii) an inaudible signal component which includes secondary information, wherein the inaudible signal component is associated with a specific portion of the audible signal component that is generated; storing, on a base station, the data representative of the sonic signal; and receiving, from the base station, the audible signal component and the inaudible signal component by a broadcast device; the received audible signal component and inaudible signal component cause the broadcast device to: customize the secondary information by inserting or embedding additional customization data into said inaudible signal component which includes the secondary information; generate the sonic signal based on the stored data representative of the sonic signal; and transmit the sonic signal from the broadcast device by actuating a speaker to propagate the sonic signal through the air as sound waves, wherein the primary information is audibly transmitted by the broadcast device for reception by a user, and wherein the inaudible signal component of the sonic signal propagated through the air is received as sound waves by a user device configured to take an action responsive to the receipt of the secondary information customized for the user based on a user profile, wherein taking the action is conditioned upon the user device detecting the inaudible signal component with the specific portion of the audible signal component.

30. The method of claim 29, wherein the data representative of the sonic signal is stored in at least one of an MP2 format, an MP3 format, an AC-3 format, an AAC format, and an HE-AAC format.

31. The method of claim 29, wherein the data representative of the sonic signal is stored as a data packet.

32. A method comprising: receiving, at a broadcast device from a base station, data representative of a sonic signal including (i) an audible signal component which includes primary information and (ii) an inaudible signal component which includes secondary information, wherein the inaudible signal component is associated with a specific portion of the audible signal component that is received; customizing the secondary information by inserting or embedding additional customization data into the received inaudible signal component which includes the secondary information; generating the sonic signal based on the received data representative of the sonic signal; and transmitting the sonic signal from the broadcast device by actuating a speaker to propagate the sonic signal through the air as sound waves, wherein the primary information is audibly transmitted from the broadcast device for reception by a user, and wherein the inaudible signal component of the sonic signal propagated through the air is received as sound waves by a user device configured to take an action responsive to the receipt of the secondary information customized for the user based on a user profile, wherein taking the action is conditioned upon the user device detecting the inaudible signal component with the specific portion of the audible signal component.

33. The method of claim 32, wherein the data representative of the sonic signal is received as a radio frequency signal.

34. The method of claim 32, wherein the broadcast device modifies the inaudible signal component based on the secondary information.

35. The method of claim 34, wherein the modification of the inaudible signal component includes inserting personalized information into the inaudible signal.

36. A method comprising: receiving an audible signal component and an inaudible signal component from a base station at a broadcast device; transmitting a sonic signal by propagating the sonic signal through the air as sound waves from the broadcast device, the sonic signal including (i) the audible signal component which includes primary information and (ii) the inaudible signal component which includes secondary information that is customized for a user based on a user profile by the broadcast device by inserting or embedding additional customization data to said inaudible signal component wherein the inaudible signal component is associated with a specific portion of the audible signal component that is transmitted, wherein the primary information is audibly transmitted from the broadcast device for reception by the user; and receiving the inaudible signal component of the sonic signal propagated through the air as sound waves at a user device configured to take an action responsive to the receipt of the secondary information customized for the user based on the user profile, wherein taking the action is conditioned upon the user device detecting the inaudible signal component with the specific portion of the audible signal component.

37. A system comprising: a memory storing at least secondary information to be communicated to a user device; and a processor configured to receive an audible signal component and an inaudible signal component from a base station, and to generate and transmit a sonic signal for propagation through the air as sound waves, the sonic signal including (i) the audible signal component which includes primary information and (ii) the inaudible signal component which includes secondary information that is customized for a user based on a user profile by a broadcast device by inserting or embedding additional customization data to said inaudible signal component wherein the inaudible signal component is associated with a specific portion of the audible signal component that is generated, wherein the primary information is configured to be audibly transmitted from the broadcast device for reception by the user, and wherein the inaudible signal component of the sonic signal, which is propagated through the air, is configured to be received as sound waves by the user device configured to take an action responsive to the receipt of the secondary information customized for the user based on the user profile, wherein taking the action is conditioned upon the user device detecting the inaudible signal component with the specific portion of the audible signal component, wherein the memory and the processor included in the broadcast device.

38. A non-transitory computer readable medium storing software instructions which, when executed, cause a system including a broadcast device to: receive an audible signal component and an inaudible signal component from a base station at the broadcast device; store information to be communicated to a user device; generate and transmit, by the broadcast device, a sonic signal for propagation through the air as sound waves, the sonic signal including (i) the audible signal component which includes primary information and (ii) the inaudible signal component which includes secondary information that is customized for a user based on a user profile by the broadcast device by inserting or embedding additional customization data to said inaudible signal component wherein the inaudible signal component is associated with a specific portion of the audible signal component that is generated, the secondary information being based on the stored information to be communicated to the user device, wherein the primary information is configured to be audibly transmitted from the broadcast device for reception by the user, and wherein the inaudible signal component of the sonic signal, which is propagated through the air, is configured to be received as sound waves by the user device configured to take an action responsive to the receipt of the secondary information customized for the user based on the user profile, wherein taking the action is conditioned upon the user device detecting the inaudible signal component with the specific portion of the audible signal component.

39. The non-transitory computer readable medium storing software instructions of claim 38, including further instructions when executed, cause a device to: receive the inaudible signal component of the sonic signal propagated through the air as sound waves from the broadcast device; and process the secondary information to cause the device to take the action.

40. A system comprising:
a broadcast device receiving a first signal component and a second signal component from a base station, and transmitting a sonic signal by propagating the sonic signal through the air as sound waves, the sonic signal including (i) the first signal component which includes primary information that is human recognizable and (ii) the second signal component which includes secondary information that is machine recognizable and is customized for a user based on a user profile by the broadcast device by inserting or embedding additional customization data to said second signal component, wherein the second signal component is associated with a specific portion of the first signal component that is transmitted,
wherein the primary information is audibly transmitted from the broadcast device for reception by the user, and
wherein the second signal component of the sonic signal propagated through the air is received as sound waves by a user device configured to take an action responsive to the receipt of the secondary information customized for the user based on the user profile, wherein taking the action is conditioned upon the user device detecting the second signal component with the specific portion of the first signal component.

41. A method comprising: generating data representative of a sonic signal including (i) a first signal component which includes primary information that is human recognizable and (ii) a second signal component which includes secondary information that is machine recognizable, wherein the second signal component is associated with a specific portion of the first signal component that is generated; providing the data representative of the sonic signal to a broadcast device from a base station; and receiving the first signal component and the second signal component by the broadcast device, the received first signal component and second signal component cause the broadcast device to: customize the secondary information by inserting or embedding additional customization data into said second signal component which includes the secondary information; generate the sonic signal based on the data representative of the sonic signal; and transmit the sonic signal from the broadcast device by actuating a speaker to propagate the sonic signal through the air as sound waves, wherein the primary information is audibly transmitted from the broadcast device for reception by a user, and wherein the second signal component of the sonic signal propagated through the air is received as sound waves by a user device configured to take an action responsive to the receipt of the secondary information customized for the user based on a user profile, wherein taking the action is conditioned upon the user device detecting the second signal component with the specific portion of the first signal component.

* * * * *